(12) United States Patent
Kuksenkov et al.

(10) Patent No.: US 7,130,512 B2
(45) Date of Patent: Oct. 31, 2006

(54) SUPERCONTINUUM EMITTING DEVICE

(75) Inventors: Dmitri Vladislavovich Kuksenkov, Painted Post, NY (US); Shenping Li, Painted Post, NY (US); Alranzo Boh Ruffin, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 98 days.

(21) Appl. No.: 11/073,278

(22) Filed: Mar. 4, 2005

(65) Prior Publication Data

US 2006/0198588 A1    Sep. 7, 2006

(51) Int. Cl.
G02B 6/00 (2006.01)
(52) U.S. Cl. .................. 385/122; 385/39; 385/123; 65/407
(58) Field of Classification Search ......... 385/122
See application file for complete search history.

(56) References Cited

U.S. PATENT DOCUMENTS

| | | | |
|---|---|---|---|
| 5,042,906 A * | 8/1991 | Chesler et al. | 385/123 |
| 6,775,447 B1 * | 8/2004 | Nicholson et al. | 385/122 |
| 2003/0063860 A1 * | 4/2003 | Watanabe | 385/39 |
| 2005/0099674 A1 * | 5/2005 | Watanabe | 359/330 |

OTHER PUBLICATIONS

Champert et al; "*1.5-2.0-μm Multiwatt Continuum Generation in Dispersion-Shifted by Use of High-Power Continuous-Wave Fiber Source*" IEEE Photonics Technology Letters, vol. 16, No. 11, Nov. 2004.

Takayanagi, et al; "*Generation of High-Power Femtosecond Pulse and Octave-Spanning Ultrabroad Supercontinuum using All-Fiber System*" IEEE Photonics Technology Letters, vol. 17, No. 1, Jan. 2005.

Ableeluck, et al "*Continuous-wave pumping in the anomalous- and normal-dispersion regimes of nonlinear fibers for supercontinuum generation*", Optics Letters, Jan. 1, 2005, vol. 30, No. 1.

A. V. Avodokhin, et al "*Continuous-wave, high-power, Raman continuum generation in holey fibers*", Optics Letters, Aug. 1, 2003, vol. 28, No. 15.

Champert, et al; "*Multiwatt average power continua generation in holey fibers pumped by kilowatt peak power seeded ytterbium fiber amplifier*", Applied Physics Letters, vol. 81, No. 12, Sep. 16, 2002.

Schrieber, et al; "*High average power supercontinuum generation in photonic crystal fibers*"; Optics Communication 228 (2003) 71-78.

Birks, et al; "*Supercontinuum generation in tapered fibers*", Optics Letters, Oct. 1, 2000, vol. 25, No. 19.

Abeeluck, et al "*Supercontinuum Generation in a Highly Nonlinear Fiber Using a Continuous Wave Pump*", OFC 2003, vol. 2, 561.

* cited by examiner

Primary Examiner—Michelle Connelly-Cushwa
(74) Attorney, Agent, or Firm—Svetlana Z. Short

(57) ABSTRACT

A supercontinuum light emitting device comprises an effectively CW light source producing light of wavelength $\lambda_1$ within a specified bandwidth and a nonlinear fiber optically coupled to the light source. The nonlinear fiber has a plurality of fiber segments with different zero dispersion wavelengths $\lambda o_i$, where each successive fiber segment has zero dispersion wavelength $\lambda o_i$ which is larger than the zero dispersion wavelength of the preceding fiber and the zero dispersion wavelength of the first fiber segment is within $\pm 20$ nm of $\lambda_1$.

15 Claims, 8 Drawing Sheets

SUPERCONTINUUM EMITTING DEVICE

BACKGROUND OF THE INVENTION

1. Field of the Invention

The present invention relates generally to supercontinuum light emitting devices and methods for generation of supercontinuum by using optical fibers.

2. Technical Background

It is known to generate supercontinuum by launching femtosecond duration ($10^{-15}$ sec) pulses of light from the light source into the optical fiber segments. For example, the device disclosed in U.S. Pat. No. 6,775,447 utilizes an optical fiber having a plurality of nonlinear fiber sections. Those sections have zero dispersion wavelengths that are within ±200 nm of the wavelength of the light source.

One of the drawbacks of the method disclosed in U.S. Pat. No. 6,775,447 is that it relies on very high peak pulse power (on the order of 10 KW or larger) to produce the supercontinuum. For example, this patent describes light pulses having about 15 KW of power (3 nJ/200×$10^{-15}$ sec). However, typically the power available from CW (continuous wave) sources is of the order of a few watts. Therefore, this technique generally would not operate with typical CW light sources.

Another technique for generating a supercontinuum is described, for example, in the article entitled "Continuous-wave pumping in the anomalous- and normal dispersion regimes of nonlinear fibers for supercontinuum generation" by A. K. Abeeluck and C. Headley [in Optics Letters, Vol. 20, No. 1, pp. 1, pp. 61–63]. This reference discloses a CW pumping of a nonlinear fiber, such that the wavelength of the source is only a few nanometers away from the zero dispersion wavelength of the non-linear fiber. Having the wavelength of the source so close to the zero dispersion wavelength of the fiber creates spectral broadening via four wave mixing phenomena. However, FIG. 1 of this reference shows that the stimulated Raman scattering (SRS) causes the resulting broadening to be strongly asymmetric, with most power extending to the longer wavelength range. Therefore, at some distance from the input end of the fiber, most of the propagating light power is in the wavelength range far from the zero dispersion wavelength, diminishing the efficiency of four wave mixing.

Therefore, there is still a need to generate CW supercontinuum in a more efficient manner.

SUMMARY OF THE INVENTION

The following definitions and terminology are commonly used in the art.

Refractive index profile—the refractive index profile is the relationship between the refractive index ($\Delta\%$) and the optical fiber radius (as measured from the centerline of the optical fiber) over a selected portion of the fiber.

Radii—the radii of the segments of the fiber are generally defined in terms of points where the index of refraction of the material used takes on a different composition. For example, the core has an inner radius of zero because the first point of the segment is on the centerline. The outer radius of the core is the radius drawn from the waveguide centerline to the last point of the refractive index of the core having a positive delta. For a segment having a first point away from the centerline, the radius of the waveguide centerline to the location of its first refractive index point is the inner radius of that segment. Likewise, the radius of the waveguide from the centerline to the location of the last refractive index point of the segment is the outer radius of that segment. For example, a down-doped annular segment surrounding the core would have an outer radii located at the interface between the annular segment and the cladding.

Relative refractive index percent $\Delta\%$—the term $\Delta\%$ represents a relative measure of refractive index defined by the equation:

$$\Delta\% = 100 \times (n_i^2 - n_c^2)/2n_i^2$$

where $\Delta\%$ is the maximum refractive index of the index profile segment denoted as i, and $n_c$, the reference refractive index, is taken to be the refractive index of the cladding layer. Every point in the segment has an associated relative index measured relative to the cladding.

According to one aspect of the present invention a supercontinuum light emitting device comprises:

an effectively CW light source producing light of wavelength $\lambda_1$ situated within the output spectrum of the effectively CW light source; and a nonlinear fiber optically coupled to said effectively CW light source; said nonlinear fiber having a plurality of fiber segments with different zero dispersion wavelengths $\lambda o_i$, where successive fiber segments have zero dispersion wavelength $\lambda o_i$ which is larger than the zero dispersion wavelength of the preceding fiber segments, and the zero dispersion wavelength $\lambda o_1$ of the first fiber segment is within ±20 nm of $\lambda_1$.

It is preferable that $\lambda_1$ is either the peak wavelength or the center wavelength of the output spectrum of the effectively CW light source.

According to one embodiment of the invention a supercontinuum light emitting device comprises:

(i) an effectively CW light source producing light of wavelength $\lambda_1$ situated within the output spectrum of the effectively CW light source;

(ii) a nonlinear fiber optically coupled to said effectively CW light source; said nonlinear fiber having a plurality of fiber segments with different zero dispersion wavelengths $\lambda o_i$, where each successive fiber segment has zero dispersion wavelength $\lambda o_i$ which is larger than the zero dispersion wavelength of the preceding fiber segment; and the zero dispersion wavelengths $\lambda o_i$ of each of the fiber segment is situated within ±10 nm of the wavelength band bound by the peak and central wavelengths of output spectrum provided from the preceding fiber segment.

According to another aspect of the present invention the supercontinuum light emitting device comprises:

(i) an effectively CW light source producing light of wavelength $\lambda_1$ situated within its output spectrum; and (ii) a nonlinear fiber optically coupled to said effectively CW light source; said nonlinear fiber having a continually varying dispersion, and having its zero dispersion wavelength $\lambda o$ which $_{is}$ continuously increasing, wherein the zero dispersion wavelength $\lambda o$ at any one point within this nonlinear fiber is within ±10 nm of the wavelength band bound by the peak and central wavelengths of light propagating through this point, and the zero dispersion wavelength of at the end of the fiber closest to the effectively CW light source is within ±20 nm of $\lambda_1$.

According to one aspect of the present invention, a method for generating supercontinuum light comprises the steps of:

(i) generating an effectively CW light of wavelength $\lambda_1$ situated within a specified spectral bandwidth; and (ii) optically coupling said effectively CW light to a nonlinear fiber, wherein said nonlinear fiber has a plurality of fiber segments with different zero dispersion wavelengths $\lambda o_i$, where each successive fiber segment has zero dispersion wavelength $\lambda o_i$ which is larger than the zero dispersion wavelength of the preceding fiber segment, and the zero dispersion wavelength of the first fiber segment is within ±20 nm of $\lambda_1$.

According to one embodiment for generating supercontinuum light, the method comprises:

(i) generating an effectively CW light of wavelength $\lambda_1$ situated within a specified spectral bandwidth; and (ii) optically coupling said effectively CW light to a nonlinear fiber; said nonlinear fiber having a plurality of fiber segments with different zero dispersion wavelengths $\lambda o_i$, where each successive fiber segment has zero dispersion wavelength $\lambda o_i$ which is larger than the zero dispersion wavelength of the preceding fiber segment; and the zero dispersion wavelengths $\lambda o_i$ of each of the fiber segment is situated within ±10 nm of the wavelength band bound by the peak and central wavelengths of the output spectrum provided by output from the preceding fiber segment.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the supercontinuum light emitting device 100 of the present invention is shown schematically in FIG. 1.

Figure 1:
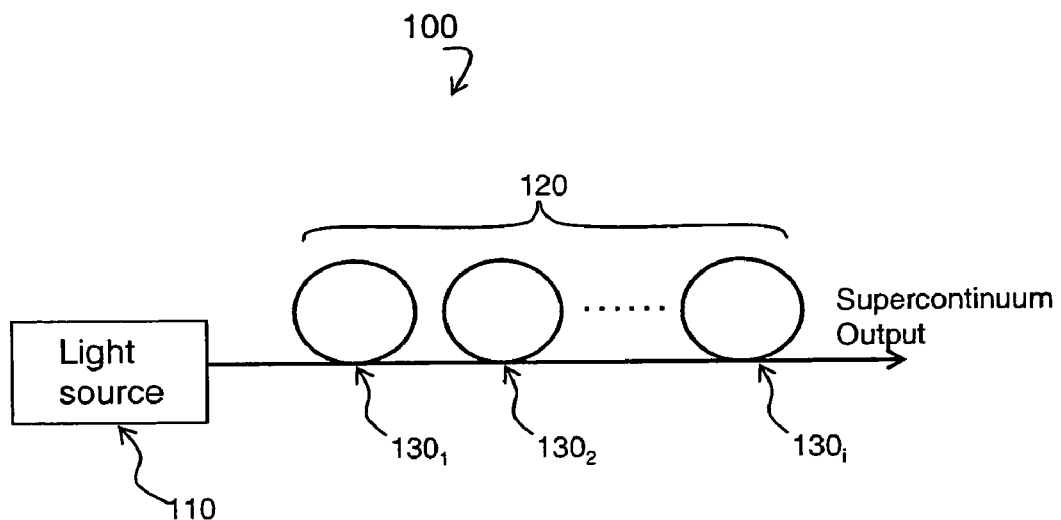
FIG. 1 is a schematic illustration of one embodiment of the supercontinuum light emitting device according to the present invention.

The supercontinuum light emitting device 100 of FIG. 1 includes: (i) an effectively CW light source 110 producing light of wavelength $\lambda_1$ situated within the output spectrum 110A of this effectively CW light source 110; and (ii) a nonlinear fiber 120 optically coupled to the effectively CW light source 110. Although $\lambda_1$ may be any wavelength situated within the output spectrum of the effectively CW light source 110, it is preferable that $\lambda_1$ be either the peak wavelength or the center wavelength of the output spectrum of this effectively CW light source.

The term "nonlinear fiber" is defined herein as an optical fiber in which an output of the effectively CW light source experiences a nonlinear phase shift $\phi_{NL}$ of at least $\pi$ (radians). The amount of the nonlinear phase shift $\phi_{NL}$ for a given light power P is determined by $\phi_{NL} = \gamma P \ast L_{eff}$ where $L_{eff}$ is the effective fiber length ($L_{eff} = 1/\alpha$ where $\alpha$ is the fiber attenuation or loss at wavelength $\lambda_1$) and $\gamma$ is the nonlinear coefficient, where $$\gamma = \frac{2\pi n_2}{\lambda A_{eff}},$$

where $\lambda = \lambda_1$ and $A_{eff}$ is the average effective area of the fiber 120. It is preferable that a nonlinear phase shift $\phi_{NL}$ be at least $10\pi$ radians. If the wavelength $\lambda_1 > 1550$ nm, it is also preferable for the value of the nonlinear coefficient $\gamma$ is be >1.

It is preferable that said light from the effectively CW light source 110 provides enough optical power P to (a) generate spectral broadening through 4-wave mixing within the nonlinear fiber 120; and (b) exceed the stimulated Raman scattering threshold of the nonlinear fiber 120. It is also preferable that the amount of power P provided by effectively CW light source is between 0.5 W and 5 KW, more preferably between 1 W and 1 KW and even more preferably between 1 W and 100 W. In the exemplary embodiments illustrated of FIGS. 1, 2A and 4 the amount of power P provided by effectively CW light source 110 is between 1 W and 10 W.

For example, in a silica based fiber 120 coupled to a effectively CW light source 110 providing 5 W of optical fiber, assuming loss of α=1 dB/km the effective length $L_{eff}$ of the fiber 120 will be about 4 km, the nonlinear phase shift γ=0.16 will be sufficient to produce $\phi_{NL}$=π radians. However, it is preferable that nonlinear phase shift γ be 1.6.

The nonlinear fiber 120 has a plurality of fiber segments $130_i$ with different zero dispersion wavelengths $\lambda o_i$, where: each successive fiber segment $130_i$ has zero dispersion wavelength $\lambda o_i$ which is longer than the zero dispersion wavelength of the preceding fiber segment $130_{i-1}$. Preferably the zero dispersion wavelength $\lambda o_1$ of the first fiber segment $130_1$ is within ±20 nm of $\lambda_1$. The last fiber segment produces supercontinuum spectrum output. Fiber segments $130_i$ may be segments of dispersion shifted fibers (DSF), photonic crystal fibers, or radially tapered fibers. These fiber segments may be doped with different materials and may include rare earth materials, for example. The fiber segments $130_i$ may be manufactured, for example, from silica, chalcogenide or tellurite based glasses. It is preferable that the wavelength $\lambda_1$ is the peak intensity wavelength of the effectively CW light source 110, or alternatively, that it corresponds to the central wavelength of the spectral band (output spectrum) produced by the effectively CW light source 110. It is noted that the output spectrum of the light source 110 may be situated in the UV region (100 nm to 400 nm), in the visible region (400 nm to 800 nm), in the near infrared (IR) region (800 nm to 1200 nm) in the mid IR region (1200 nm to 10000 nm), or in the far IR region (10000 nm to 20000 nm). It is preferred that the light source 110 provides enough power or intensity to the optical fiber to operate nonlinearly, so as to generate spectral broadening through 4-wave mixing. It is preferred that the length of the fiber segment $130_i$ is about 1 m to 2 km and that the length of the nonlinear fiber 120 be less than 15 km. It is preferred that the length of the nonlinear fiber 120 be less than 5 km.

The effectively CW (continuous wave) source is defined herein as a light source that has a pulse length that is longer then the time required for the light to go through length along the center of the nonlinear fiber 120. For example, for a signal pulse to propagate through a 1 km length of silica based optical fiber, it would take the pulse 5 micro-seconds to travel through this fiber. Therefore, a CW light source (infinite pulse duration), and any light source with a long pulse duration, such that the pulse duration is longer than the fiber propagation time (in this example, 5 micro seconds) are both referred to as effectively CW source.

Preferably, the power produced by the effectively CW source 110 exceed the stimulated Raman scattering threshold of the nonlinear fiber. In this case Raman scattering and four wave mixing work synergistically to achieve more efficient spectral broadening. The effectively CW source may be, for example, a solid state laser, a cascaded Raman fiber laser, or a MOPA (master oscillator power amplifier) comprising a seed laser source and a high power fiber amplifier, or an amplified spontaneous emission source (for example, high power fiber amplifier operating without the seed source). Preferably, the line width of the effectively CW light source exceeds the SBS (stimulated Brillouin Scattering) gain bandwidth of the nonlinear fiber 120. It may also be advantageous if the effectively CW light source 110 provides light in a continuous spectrum broader than 1 nm and less than 30 nm, or in several closely spaced spectral lines (i.e., less than 1 nm apart). If the light source 110 produces light output characterized by several closely spaced spectral lines or a continuous spectrum broader than 1 nm, then interference between different spectral components provided by the light source 110 will produce random pulses of light (duration and amplitude), seeding the generation of the supercontinuum.

According to one embodiment of the invention a supercontinuum light emitting device 100 comprises: (i) an effectively CW light source 110 capable of producing light of wavelength $\lambda_1$ situated within its output spectrum; (ii) a nonlinear fiber 120 optically coupled to said light source; the nonlinear fiber 120 having a plurality of fiber segments 130; with different zero dispersion wavelengths $\lambda o_i$, where each successive fiber segment (traveling away from the effectively CW light source 110) has zero dispersion wavelength $\lambda o_i$ which is longer than the zero dispersion wavelength of the preceding fiber segment; and the zero dispersion wavelengths $\lambda o_i$ of each of the fiber segment is situated within ±10 nm of the wavelength band bound by the peak and central wavelengths provided by the output from the preceding fiber segment. It is preferable that the zero dispersion wavelength $\lambda o_1$ of the first fiber segment $130_1$ is within ±20 nm of $\lambda_1$. It is preferable that the zero dispersion wavelength of at the end of the fiber 120 closest to the effectively CW light source (input end) is within the same or shorter than $\lambda_1$. It is even more preferable that that the zero dispersion wavelength $\lambda o_1$ is: $(\lambda_1-3\ nm) \leq \lambda o_1 \leq \lambda_1$. The dispersion slope of any fiber segment $130_i$ is preferably positive and is preferably below +0.05 ps/nm²/km.

Figure 2A:
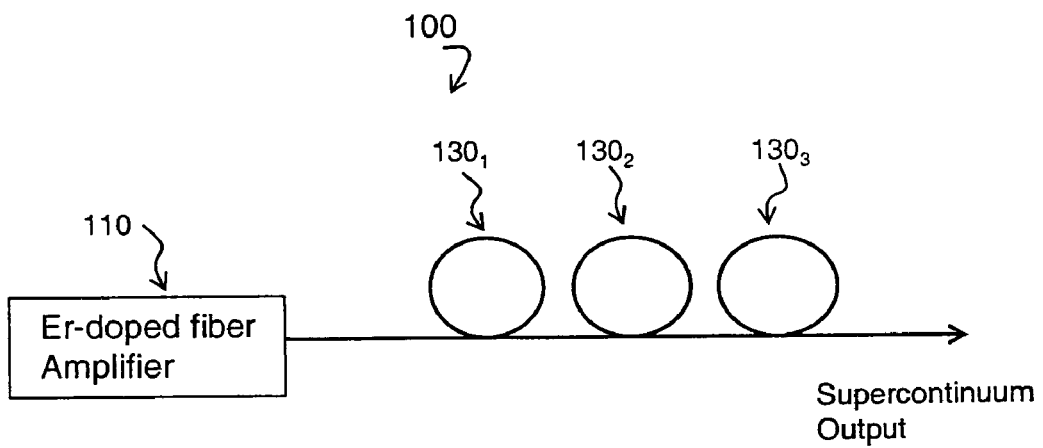
FIG. 2A is a schematic illustration of another embodiment of the supercontinuum light emitting device according to the present invention.
Figure 2B:
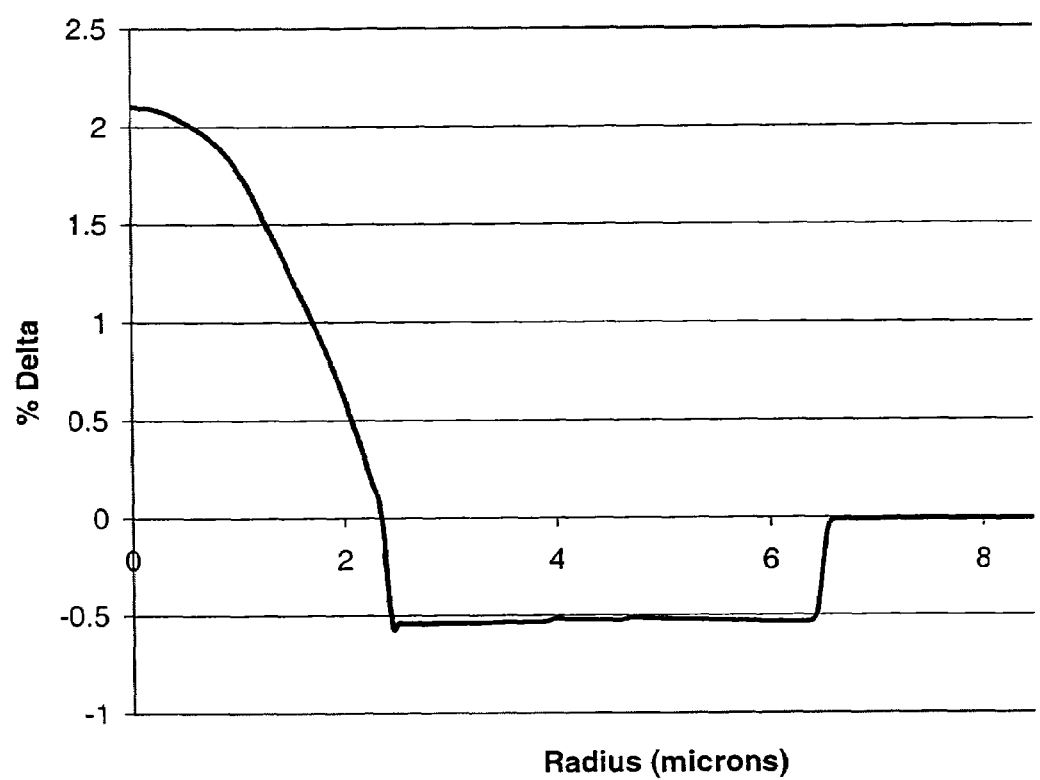
FIG. 2B illustrates refractive index profile of the exemplary fiber segment $130_1$ of FIG. 2A.

FIG. 2A is similar to FIG. 1, but the effectively CW light source 110 of FIG. 2 is a high power Er doped fiber amplifier operating as an ASE (Amplified Spontaneous Emission) source. In addition, the supercontinuum emitting device 100 of FIG. 2A comprises three fiber segments $130_1$, $130_2$, $130_3$, arranged in series and coupled to one another. Each of the fiber segments $130_1$, $130_2$, $130_3$ has approximately zero dispersion in the 1550 nm wavelength range (1450 nm to 1650 nm). FIG. 2B illustrates fiber profile of the exemplary fiber segment $130_1$ is shown in FIG. 2B, where vertical axis corresponds to the refractive index % delta of this fiber segment and the horizontal axis corresponds to the radial distance from the axis (i.e. center line) of the fiber segment. The refractive index % delta of this fiber is measured at a wavelength of 1550 nm. In this illustrative example, the Er doped fiber amplifier delivers maximum output ASE power of about to 2 W. The zero dispersion wavelengths of the three fiber segments $130_1$, $130_2$, $130_3$, are at 1530.5 nm, 1550 nm, and 1590 nm, respectively. It is noted that the dispersion slope and the zero dispersion wavelength of the fiber segment shown in FIG. 2B may be altered by the radial scaling of the fiber profile, to produce the fiber profiles of fiber segments $130_2$, $130_3$. Other parameters of the fiber segments $130_1$, $130_2$, $130_3$ are listed in Table 1. In this embodiment, the input wavelength band produced by the effectively CW light source 110 is 1530 nm to 1560 nm wide. In this example, the input wavelength $\lambda_1$ corresponds to the intensity peak of this spectral band, which is about 1535 nm and the output spectrum of the light source 110 is situated in the mid IR range and is about 1530 nm to 1570 nm.

TABLE 1

| Parameter | fiber segment $130_1$ | fiber segment $130_2$ | fiber segment $130_3$ |
| --- | --- | --- | --- |
| Dispersion @ 1550 nm (ps/nm/km) | 0.782 | ~0 | −1.4 |
| Fiber length (km) | 1.005 | 1 | 3.975 |
| Loss @ 1550 nm (dB/km) | 0.578 | 0.5 | 0.48 |
| Dispersion slope (ps/nm²/km) | 0.04 | 0.03 | 0.035 |

Figure 3:
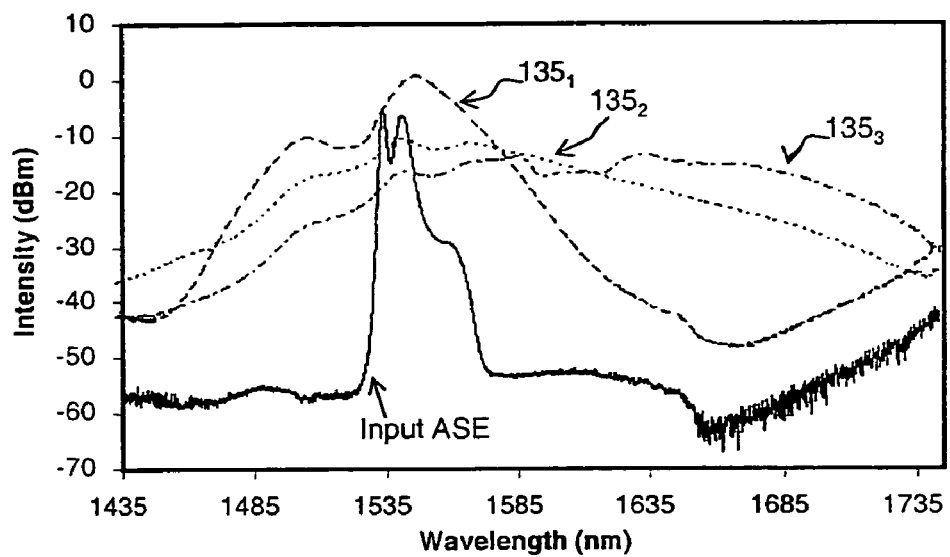
FIG. 3 is an illustration of intensity at the input of the first fiber segment and at the output of each successive fiber segment of FIG. 2, as a function of wavelength.

FIG. 3 corresponds to FIG. 2 and illustrates the output spectrum of the Er doped fiber amplifier (light source 110) and the respective output spectrums $135_1$, $135_2$, $135_3$ produced by the successive fiber segments $130_1$, $130_2$, $130_3$. FIG. 3 illustrates the input ASE spectrum (from the source 110) and the measured output spectra after successive fiber segments $130_1$, $130_2$, $130_3$ for the input power of 1.5 W. The intensity peak of the input ASE spectrum is $\lambda_1$=1535 nm which coincides with the zero dispersion wavelength of the fiber segment $130_1$.

The spectral width at the −15 dB level from the maximum (peak) level at the input to the first fiber segment $130_1$ is about 15 nm. The spectral width at the −15 dB level from the maximum (peak) level at output end of the first fiber segment $130_1$ is about 90 nm. This broadening is due to four-wave mixing in the fiber segment $130_1$, and the peak of the spectrum is shifted at the output end of the first fiber segment from 1535 nm to 1550 nm because of the SRS (stimulated Raman scattering) effect. Since the dispersion zero of the second fiber segment $130_2$ is at the spectral peak of the output of the first fiber segment $130_1$, the four-wave mixing in the second fiber segment $130_2$ further enlarges the spectral bandwidth to about 200 nm (at −15 dB level). The SRS effect shifts the spectral peak of the output from 1550 nm to 1570 nm. FIG. 3 illustrates that a 240 nm (at the −15 dB level) broad supercontinuum is produced at the output of third fiber segment $130_3$.

Figure 4:
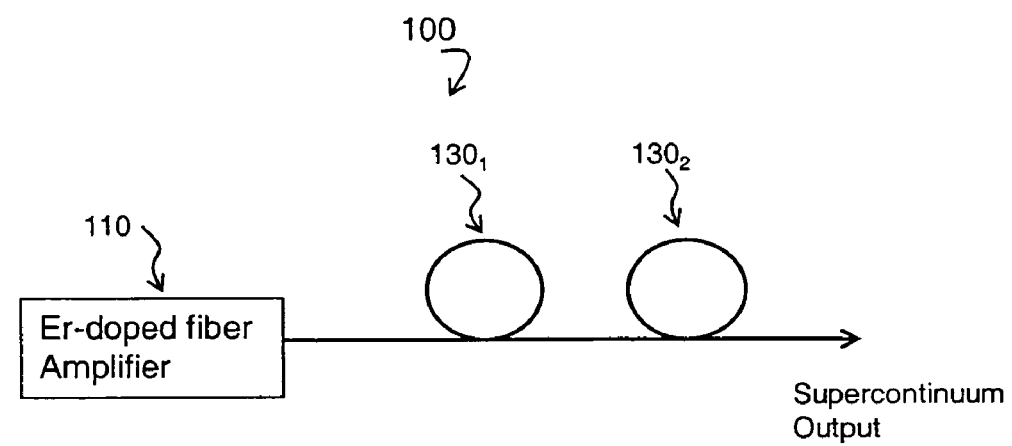
FIG. 4 is a schematic illustration of yet another embodiment of the supercontinuum light emitting device according to the present invention.

FIG. 4 is similar to FIGS. 1 and 2, but the supercontinuum light emitting device 100 of this embodiment comprises two fiber segments $130_1$, $130_2$, coupled to one another. In this embodiment, the input wavelength band produced by the light source 110 is 1530 nm to 1560 nm. In this example, the input wavelength $\lambda_1$ corresponds to the intensity peak of this spectral band and is about 1535 nm. More specifically, this super supercontinuum light source 100 utilizes the light source 110 and the two fiber segments $130_1$, $130_2$ that are identical to those shown in FIGS. 2 and 3.

Figure 5:
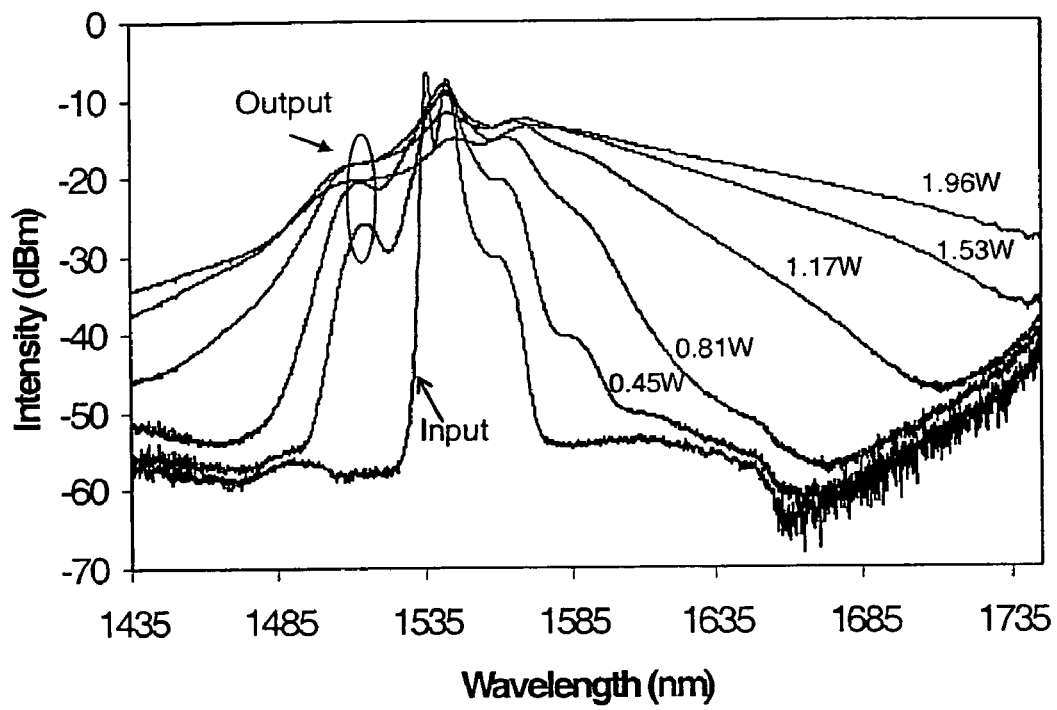
FIG. 5 is an illustration of intensity at the input end of the first fiber segment and at the output end of last fiber segment of FIG. 4, as a function of wavelength, at different input power.

FIG. 5 illustrates the broadening of the supercontinuum spectrum at the output of second fiber segment $130_2$ as the input power from the light source 110 increases from 0.45 W to 1.96 W. As the input power increases, the output intensity increases and the output spectrum provided at the out put end of fiber segment $130_2$ broadens from about 45 nm to 275 nm, at the −15 dB level from the intensity peak at the output.

Figure 6:
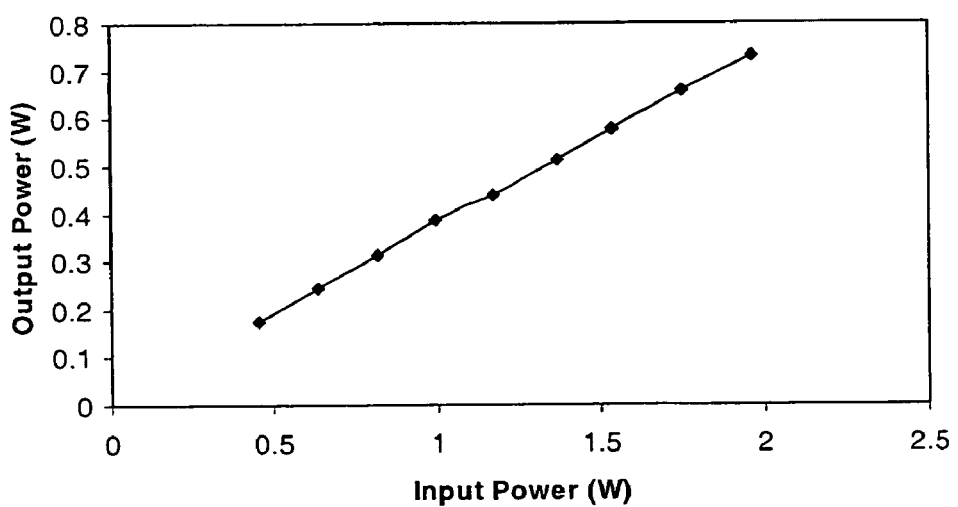
FIG. 6 is illustrates the output power values vs input power values for the embodiment of FIG. 4.

FIG. 6 illustrates the change of output power of the superconitniuum emitting device 100 of FIG. 4 with the change in input power provided by the light source 110. The output power increases linearly with the input power, indicating that there is no stimulated Brilluoin scattering present in the fiber segments $130_1$, $130_2$. Thus, this supercontinuum light source 100 is operating in a very efficient manner and does not require suppression of Brilluoin scattering.

Figure 7:
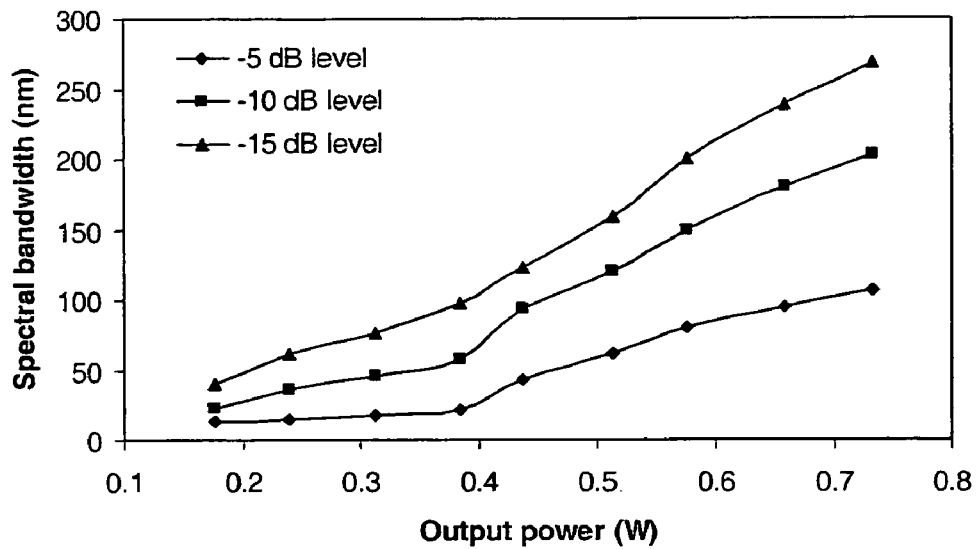
FIG. 7 is an illustration of changes in the output spectral bandwidth vs output power for the embodiment of FIG. 4, at three different intensity levels.

FIG. 7 illustrates the change of the supercontinuum spectral bandwidth of the output of the second fiber segment $130_2$ as a function of the output power, at −5 dB, −10 dB, and −15 dB from the peak of the output power level. Because of the arbitrary shape of the supercontinuum for the various spectra in FIG. 5, FIG. 7 demonstrates the monotonic spectral broadening with increasing output power, at the −5, −10, and −15 dB from the maximum spectral peak of the output power level. At the maximum launched input power of 1.96 W, the supercontinuum spectrum at the output of the second fiber segment $130_2$ extended over 268 nm at −15 dB level, and the output power reached 0.73 W, giving an average spectral power density of 2.7 mW/nm.

Figure 8:
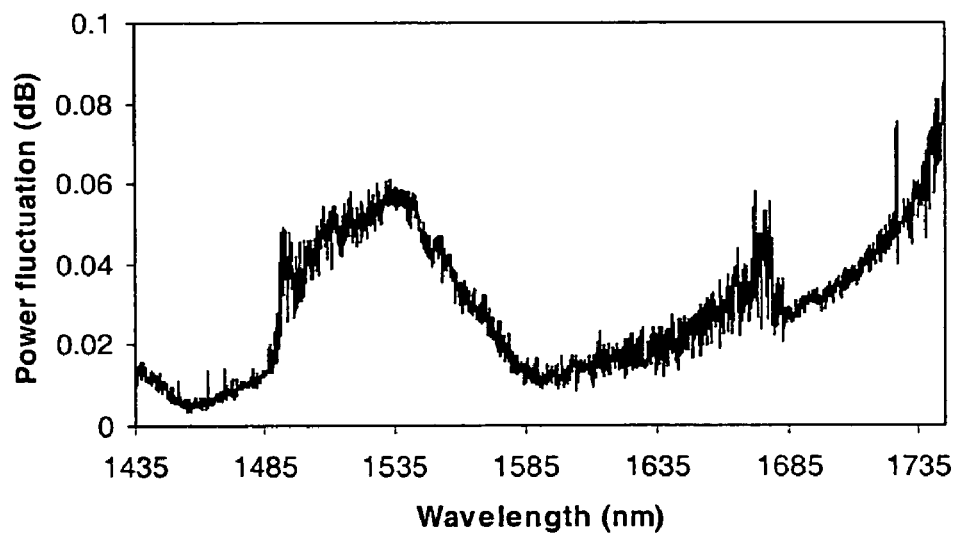
FIG. 8 is a graph of output power fluctuations of the supercontinuum light emitting device of FIG. 4, vs. wavelength.

FIG. 8 is a graph of output power fluctuations of the supercontinuum source of FIG. 4, vs. wavelength. This figure illustrates the long-term stability of the supercontinuum spectrum at the output from the output of the second fiber segment $130_2$. More specifically, output power fluctuation over the wavelength range between 1435 nm and 1735 nm was investigated at a fixed input power of 1.88 W, averaged over a period of 100 minutes, with the measurements taken every 5 minutes. The plot demonstrates standard deviation of the power per each wavelength of interest (over the 20 measurements). The maximum deviation is 0.09 dB, at the wavelength of 1735 nm. It is noted that the maximum power fluctuation at the input of the first fiber segment (i.e. from the light source 110) over that time period was 2%. As shown in FIG. 8, the supercontinuum spectrum showed very good long-term stability with a maximum standard deviation in power of only 0.09 dB over a period of 100 minutes.

Figure 9:
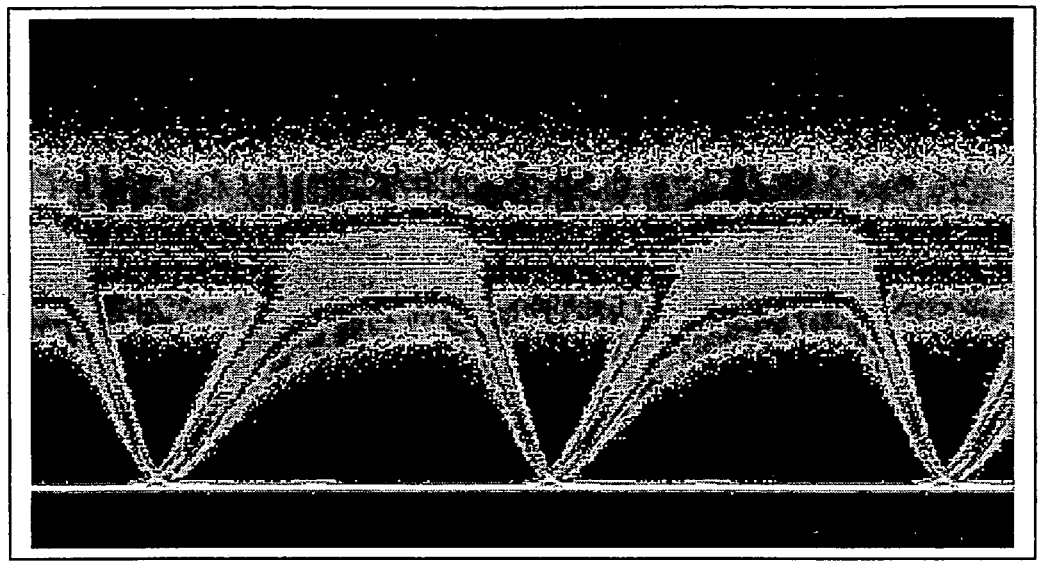
FIG. 9 is an eye diagram of the output of the supercontinuum light emitting device of FIG. 4, modulated at 125 Mb/s.

In a separate experiment, the supercontinuum light emitting device 100 was utilized as a light source in a wavelength-division multiplexed passive optical network (WDM-PON). The supercontinuum light was spectrally filtered by using a fine tunable filter (0.8 nm bandwidth) to select a single spectral channel. The CW light of the selected channel was launched into a semiconductor optical amplifier (SOA). The data was encoded on the CW signal by directly modulating the SOA. FIG. 9 shows an eye diagram of the output from the SOA for a bit rate of 125 Mb/s for the filter centered at 1542.9 nm. The eye is clear and wide open, indicating that it is possible to transmit the signal through a predetermined length of transmission fiber without error. Similar result was achieved over the entire tunable bandwidth of the filter (1535–1565 nm).

Figure 10:
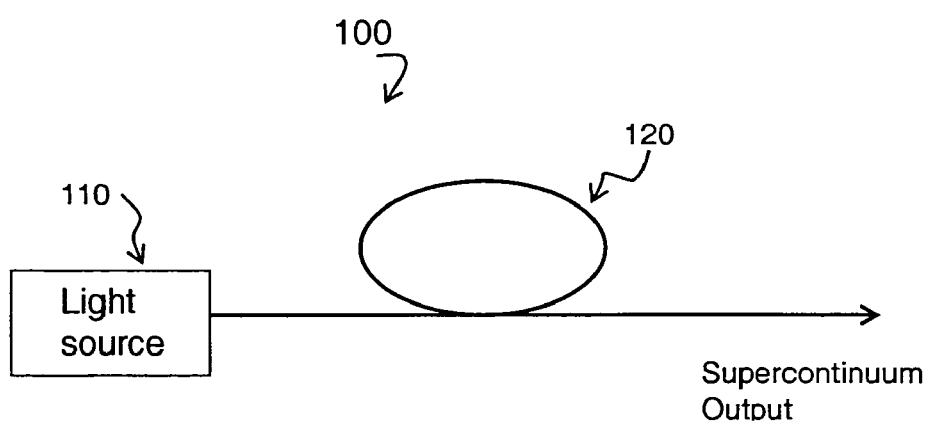
FIG. 10 is a schematic illustration of yet another embodiment of the supercontinuum light emitting device according to the present invention.

FIG. 10 illustrates another embodiment of the supercontinuum light emitting device 100. The supercontinuum light source 100 shown in FIG. 10 includes, as in the previous embodiment, an effectively CW light source 110 producing light of wavelength $\lambda_1$ situated within its output spectrum; and a nonlinear fiber 120 optically coupled to the light source 110. However the nonlinear fiber 120 has a continually varying dispersion, and the dispersion wavelength λo which is continuously increasing. The zero dispersion wavelength λo of this fiber 120, at any one point within this fiber, is within ±10 nm of the wavelength band bound by the peak and central wavelengths of light propagating through this point. In addition, the zero dispersion wavelength at the end of the fiber closest to the effectively CW light source is within ±20 nm of $\lambda_1$. It is preferable that the zero dispersion wavelength at the end of the fiber closest to the effectively CW light source is within the same or shorter than $\lambda_1$. The dispersion slope of the fiber 120 is preferably positive and is preferably below +0.05 ps/nm²/km. The nonlinear fiber 120 may be, for example, a dispersion shifted fiber (DSF), a photonic crystal fiber, or a radially tapered fiber. This fiber may be doped with different materials to provide the required refractive index profile and may include rare earth materials, for example. The nonlinear fiber 120 may be made, for example, from silica, chalcogenide or telluride based glasses.

Thus, according to an embodiment of the present invention a method for generating supercontinuum light may include the following steps:

(i) generating an effectively CW light of wavelength $\lambda_1$ situated within a specified spectral bandwidth and (ii) optically coupling said light to a non linear fiber having fiber wherein said light has enough power to (a) generate spectral broadening through 4-wave mixing and (b) exceed the stimulated Raman scattering threshold of the nonlinear fiber, and the nonlinear fiber has a plurality of fiber segments with different zero dispersion wavelengths $\lambda o_i$, where successive fiber segment has zero dispersion wavelength $\lambda o_i$ which is longer than the zero dispersion wavelength of the preceding fiber segment, and the zero dispersion wavelength of the first fiber segment is within ±20 nm of $\lambda_1$.

As stated above, $\lambda_1$ may be any wavelength situated within the output spectrum of the effectively CW light source 110, however, it is preferable that $\lambda_1$ be either the peak wavelength or the center wavelength of the output spectrum of this effectively CW light source.

Thus, according to one embodiment of the present invention, a method for generating supercontinuum light includes the step of coupling light from an effectively CW light source capable of produce light of wavelength $\lambda_1$ situated within its output spectrum to a nonlinear fiber such that the light has enough power to (a) generate spectral broadening through 4-wave mixing and (b) exceed the stimulated Raman scattering threshold of the nonlinear fiber; the nonlinear fiber having a plurality of fiber segments with different zero dispersion wavelengths $\lambda o_i$, where each successive fiber segment has zero dispersion wavelength $\lambda o_i$ which is larger than the zero dispersion wavelength of the preceding fiber segment; and the zero dispersion wavelengths $\lambda o_i$ of each of the fiber segment is situated within ±10 nm of the wavelength band bound by the peak and central wavelengths provided by output from the preceding fiber segment.

According to another embodiment, a method for generating supercontinuum light includes the step of coupling the light output of an effectively CW light source of wavelength $\lambda_1$ to an optical fiber such that the light output has enough power to (a) generate spectral broadening through 4-wave mixing within the optical fiber and (b) exceed the stimulated Raman scattering threshold of the optical fiber, wherein the nonlinear fiber has a continually varying dispersion, and zero dispersion wavelength $\lambda o$ which is continuously increasing, wherein the zero dispersion wavelength $\lambda o$ at any one point within this nonlinear fiber is within ±10 nm of the wavelength band bound by the peak and central wavelengths of light propagating through this point, and the zero dispersion wavelength of at the input end of the optical fiber (i.e., the end closest to the effectively CW light source) is within ±20 nm of $\lambda_1$.

It is noted that the supercontinuum emitting devices described above can be utilized, along with other optical components in sensing (chemical, biological, environmental), imaging (medical or other), or optical networking applications. It is noted that if the zero dispersion wavelength(s) of the nonlinear fiber 120 is in the visible wavelength range (400 nm–800 nm), the supercontinuum emitting devices described above will produce a supercontinuum visible spectrum and be excellent sources of "white" light.

Figure 11:
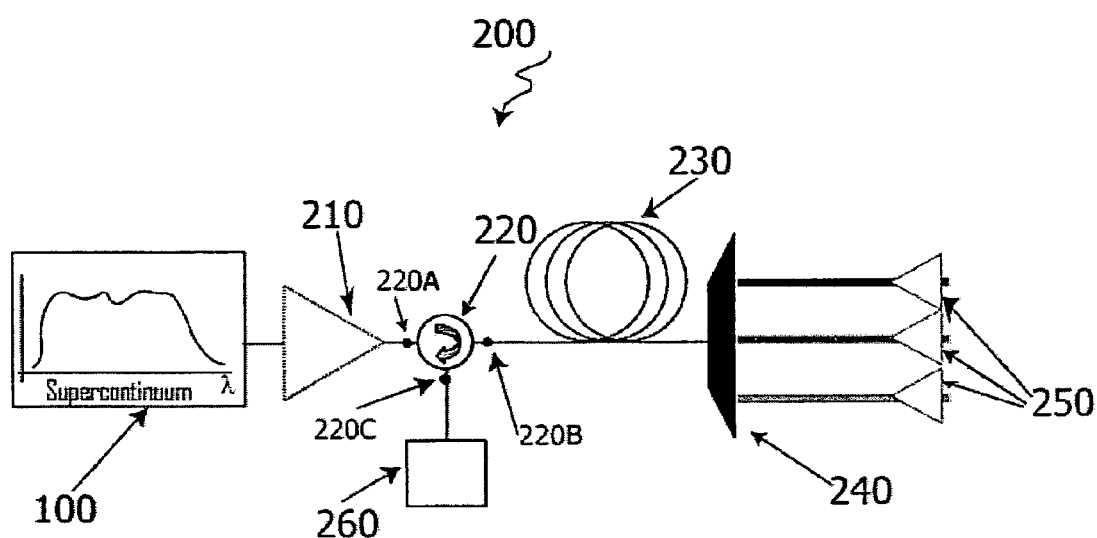
FIG. 11 is a schematic illustration of a wavelength-division multiplexed (WDM) passive optical network utilizing the supercontinuum light emitting device according to the present invention.

FIG. 11 illustrates a wavelength-division multiplexed passive optical network 200 comprising one of the supercontinuum emitting devices 100 described above. More specifically, the wavelength-division multiplexed passive optical network 200 includes the supercontinuum emitting device 100 coupled to at least one (optional) optical amplifier 210. The light from the optical amplifier(s) 210 is provided to the input port 220A (first port) of an optical circulator 220, and is outputted through the second port 220B of the circulator 220 to transmission fiber 230. The transmission fiber 230 provides the light, at its second end 230B to the optical multiplexer/de-multiplexer 240. The multiplexer/de-multiplexer 240 separates light into several spatially separated spectral components. Each spectral component is modulated by its respective modulator 250 and the modulated spectral components are reflected back to the multiplexer/de-multiplexer 240. The multiplexer/de-multiplexer 240 re-combines the modulated spectral components into one light beam and provides it to the second end 230B of the transmission fiber 230. The re-combined light provided to the second port 220B of the optical circulator then exits through the third port 220C of the optical circulator and propagates toward an optical receiver 260.

Figure 12:
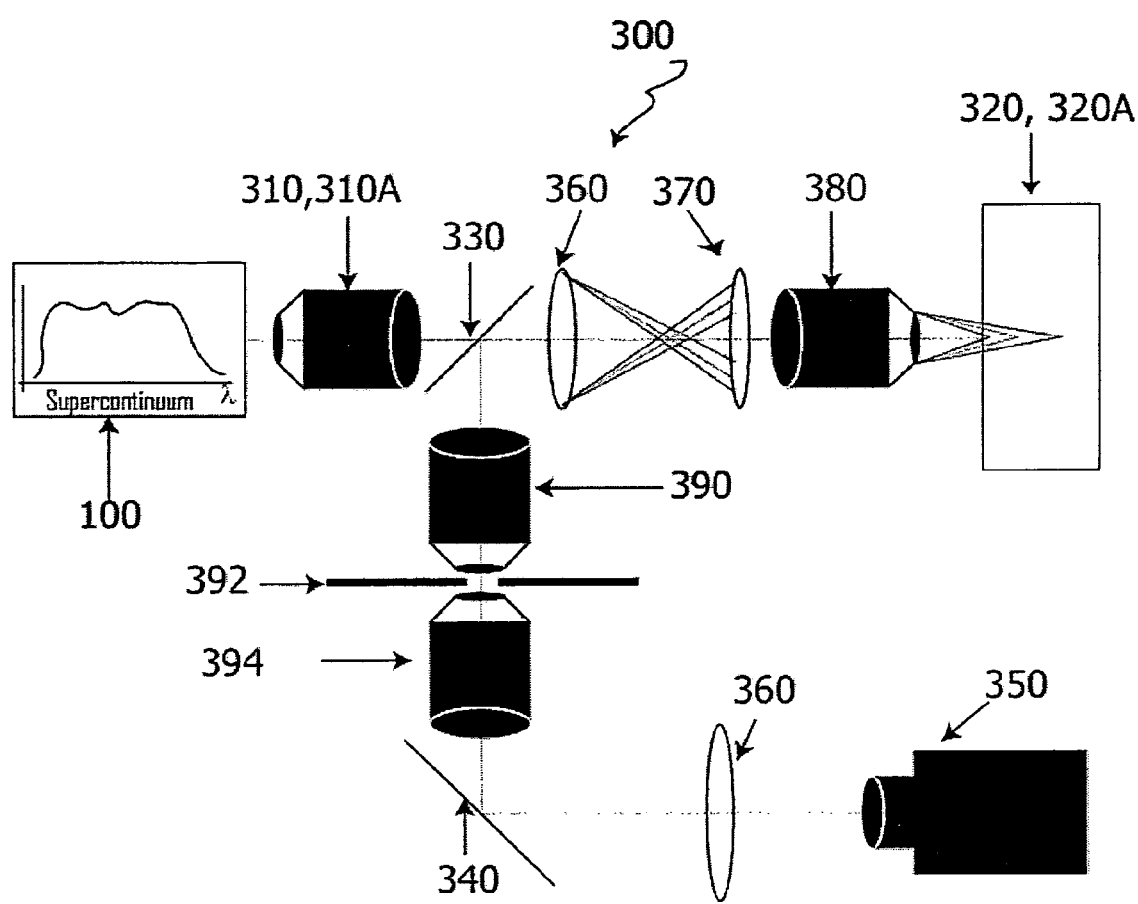
FIG. 12 is illustrates an imaging system utilizing the supercontinuum light emitting device according to the present invention.

As stated above, the supercontinuum light emitting devices described above can be utilized, along with other optical components in various sensing devices. An exemplary sensing device 300 is illustrated schematically in FIG. 12. More specifically, the sensing device 300 of FIG. 12 is utilized to find defects in an object under test. The sensing device 300 of this exemplary embodiment is an imaging system comprising the supercontinuum emitting device 100 and the following optical components: an imaging component 310 (for example an objective lens system 310A) optically coupled to the supercontinuum light source 100, a test sample 320 located behind this imaging component 310, a partially reflective beam splitter 330 situated between the test sample 320 and the imaging component 310; a diffractive grating 340, and a spatial light detector 350 (for example, a CCD camera or an array of photodiodes). The imaging component 310 focuses the light provided by the supercontinuum light source 100, and produces a series of focal planes, corresponding to different light wavelengths. The beam splitter 330 is situated inside the series of focal planes produced by the imaging component 310. The light propagated through the beam splitter 330 is provided by additional optical components 360, 370, 380 to the test sample 320 (i.e., the transparent object 320A, that is being tested or analyzed). The light is imaged at the test sample 320, such that different foci $380_1$ (corresponding to different wavelengths) are formed at different positions within the test sample's thickness. The light is then reflected from the test sample 320 (or the object under test 320A) and is propagated via optical components 360 (lens system), 370 (imaging lens), 380 (objective lens system) towards the reflective beam splitter 330, via optical components 390, 392 and 394. The reflected light carries information, for example about the defects within the test sample 320, and thus is capable of providing information (via different wavelengths that correspond to different depth within the object) about where in the test sample such defects are found. The diffractive grating 340 receives the light provided by the optical components 390, 392 and 394 and spatially separates this light according to several spectral components (of different wavelengths). The detector 350 receives the light spatially separated into spectral components, so that light intensity associated with different wavelengths is detected at different locations of the detector 350. Thus, this system may be utilized, for example to detect defects imbedded in the test sample 320 (for example LCD glass) by providing information about defects at different depths within the test sample. It is noted that the light impinging on the test sample 320 may be moved relative to the test sample along X-and/Y axis, thus providing three dimensional information about the test sample 320.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. A supercontinuum light emitting device comprising:
   (i) an effectively CW light source capable of producing light of wavelength $\lambda_1$ situated within its output spectrum; and
   (ii) a nonlinear fiber optically coupled to said light source; said nonlinear fiber having a plurality of fiber segments with different zero dispersion wavelengths $\lambda o_i$, where successive fiber segments have zero dispersion wavelength $\lambda o_i$ which is longer than the zero dispersion wavelength of their preceding fiber segment, and the zero dispersion wavelength of the first fiber segment is within $\pm 20$ nm of $\lambda_1$.

2. The supercontinuum light emitting device according to claim 1 wherein $\lambda_1$ is either the peak wavelength or the center wavelength of the output spectrum of the effectively CW light source.

3. A supercontinuum light emitting device according to claim 1 wherein,
   the zero dispersion wavelengths $\lambda o_i$ of the successive fiber segments is situated within $\pm 10$ nm of the wavelength band bound by the peak and central wavelengths of light provided by output from the preceding fiber segment.

4. The supercontinuum light emitting device according to claim 3, wherein the zero dispersion wavelength of the first fiber segment is within $\pm 10$ nm of $\lambda_1$.

5. The supercontinuum light emitting device according to claim 3 wherein $\lambda_1$ is either the peak wavelength or the center wavelength of the output spectrum of the effectively CW light source.

6. A wavelength-division multiplexed passive optical network comprising the supercontinuum light emitting device of claim 3.

7. An optical system including the supercontinuum light emitting device according to claim 1 and further including other optical components.

8. A wavelength-division multiplexed passive optical network comprising the supercontinuum light emitting device of claim 1.

9. An imaging system comprising:
   (i) a supercontinuum light emitting device of claim 1;
   (ii) an imaging component optically coupled to said light source, the imaging component (a) focusing the light provided by the supercontinuum light source, and (b) producing a series of focal planes, corresponding to different light wavelengths;
   (iii) a reflector located behind said optical component;
   (iv) and a partially reflective beam splitter situated between said reflector, and said imaging component, inside said series of focal planes, the reflector reflecting the light received from the beam splitter;
   (v) a diffractive grating receiving the light reflected by the reflector and spatially separating the light according to different wavelengths;
   (vi) spatial light detector receiving the light that has been spatially separated according to wavelengths,
   so that light intensity associated with different wavelengths is detected at different locations of the detector.

10. A supercontinuum light emitting device comprising:
    (i) an effectively CW light source producing light of wavelength $\lambda_1$ situated within its output spectrum; and
    (ii) a nonlinear fiber optically coupled to said effectively CW light source; said nonlinear fiber having a continually varying dispersion, and having its zero dispersion wavelength $\lambda o$ which is continuously increasing,
    wherein the zero dispersion wavelength $\lambda o$ at any one point within this fiber is within $\pm 10$ nm of the wavelength band bound by the peak and central wavelengths of light propagating through this point,
    and the zero dispersion wavelength of at the end of the fiber closest to the effectively CW light source is within $\pm 20$ nm of $\lambda_1$.

11. A method for generating supercontinuum light, the method comprising:
    (I) generating an effectively CW light of wavelength $\lambda_1$ situated within a specified spectral bandwidth; and
    (II) optically coupling said light to a nonlinear fiber, wherein said nonlinear fiber either
       (i) has a plurality of fiber segments with different zero dispersion wavelengths $\lambda o_i$, where each successive fiber segment has zero dispersion wavelength $\lambda o_i$ which is longer than the zero dispersion wavelength of the preceding fiber segment the zero dispersion wavelength of the first fiber segment is within $\pm 20$ nm of $\lambda_1$; or
       (ii) has a continually varying dispersion, and zero dispersion wavelength $\lambda o$ which is continuously increasing, wherein the zero dispersion wavelength $\lambda o$ at any one point within this fiber is within $\pm 10$ nm of the wavelength band bound by the peak and central wavelengths of light propagating through this point, and the zero dispersion wavelength of the nonlinear fiber, near the input end, is within $\pm 20$ nm of $\lambda_1$.

12. The method for generating supercontinuum according to claim 11 wherein
    said effectively CW light has enough power to (a) generate spectral broadening through 4-wave mixing within the nonlinear fiber; and (b) exceed the stimulated Raman scattering threshold of the nonlinear fiber.

13. The method according to claim 11 wherein $\lambda_1$ is either the peak wavelength or the center wavelength of the output spectrum of the effectively CW light.

14. The method according to claim 11 wherein $\lambda_1$ is either the peak wavelength or the center wavelength of the light spectrum of the effectively CW light coupled to the nonlinear fiber.

15. The method according to claim 11 wherein said effectively CW light has power between 1 W and 10 W.

* * * * *